(12) United States Patent
Dower

(10) Patent No.: US 7,631,714 B2
(45) Date of Patent: Dec. 15, 2009

(54) MOTOR VEHICLE STEERING CONTROL

(76) Inventor: Gordon Ewbank Dower, 2266 Sunrise Dr., Point Roberts, WA (US) 98281

(\*) Notice: Subject to any disclaimer, the term of this patent is extended or adjusted under 35 U.S.C. 154(b) by 560 days.

(21) Appl. No.: 11/475,195

(22) Filed: Jun. 27, 2006

(65) Prior Publication Data

US 2008/0017436 A1    Jan. 24, 2008

(51) Int. Cl.
B62D 1/02    (2006.01)
(52) U.S. Cl. .......................... 180/78; 180/333
(58) Field of Classification Search ............ 180/78, 180/333, 433, 408, 412, 413; 428/195.1
See application file for complete search history.

(56) References Cited

U.S. PATENT DOCUMENTS

| | | | |
|---|---|---|---|
| 1,882,542 A | 10/1932 | Bolz | |
| 2,001,647 A | 5/1935 | Alt | |
| 2,234,888 A | 3/1941 | Blagden | |
| 2,834,605 A | 5/1958 | McCollough | |
| 2,915,319 A | 12/1959 | Kumler et al. | |
| 3,198,541 A | 8/1965 | Christenson et al. | |
| 3,666,034 A | 5/1972 | Stuller et al. | |
| 3,903,983 A | 9/1975 | Yeske | |
| 4,283,074 A | 8/1981 | Tidwell | |
| 4,355,697 A | 10/1982 | Orlandea et al. | |
| 4,852,679 A | 8/1989 | Fry | |
| 5,090,512 A | 2/1992 | Mullet et al. | |
| 5,144,857 A | 9/1992 | Kemper | |
| 5,217,083 A \* | 6/1993 | Bachhuber et al. | 180/415 |
| 5,443,669 A \* | 8/1995 | Tunker | 156/102 |
| 5,492,348 A | 2/1996 | Shaw et al. | |
| 5,766,702 A \* | 6/1998 | Lin | 428/13 |
| 5,914,178 A \* | 6/1999 | Sol et al. | 428/195.1 |
| 6,135,465 A \* | 10/2000 | Chapman | 280/47.11 |
| 6,371,243 B1 | 4/2002 | Donaldson et al. | |
| 6,488,504 B1 | 12/2002 | Patterson | |
| 6,793,036 B1 | 9/2004 | Enmeiji et al. | |
| 7,334,658 B2 \* | 2/2008 | Berg et al. | 180/333 |
| 2004/0129491 A1 | 7/2004 | Bean et al. | |

FOREIGN PATENT DOCUMENTS

WO    WO0228677 A1    4/2002

\* cited by examiner

*Primary Examiner*—Kevin Hurley

(57) ABSTRACT

A motor vehicle steering control provides two degrees of freedom with a one-handed operation that is simple and intuitive. The control is achieved with a joystick control movable from side to side (e.g. as in an aircraft) in combination with a yoke control which rotates on an axis (e.g. like the steering wheel of a car). The yoke control (giving one degree of freedom) is mounted to the joystick control, the latter of which adds a second degree of freedom. The steering of both the front and rear wheels of a variety of vehicles may be controlled, including vehicles where the operator rides with the vehicle and, as well, remote controlled vehicles where the operator is situated remote from the vehicle. The latter case contemplates remote controlled steering not only of full scale vehicles designed to move or haul some load but also model vehicles such as radio-controlled model cars and the like.

6 Claims, 3 Drawing Sheets

MOTOR VEHICLE STEERING CONTROL

BACKGROUND OF THE INVENTION

The present invention relates to the steering of motor vehicles and, in particular, to the steering of motor vehicles where both the front wheels and rear wheels are steerable.

In most conventional vehicles, steering is accomplished using only the front wheels. However, having the rear wheels also steer increases maneuverability and has been used in cars, riding lawn mowers, and special-purpose vehicles. Control has been realized by linking front and rear steering to be operated with a single steering wheel or by using two independent systems controlled separately, either by two controls—as in a long fire truck with a second driver in the rear to drive the rear end—or with a switched control. However, linked controls, in which both front and rear wheel systems work together to give a shorter turning radius, do not allow a sideways or crabbing movement, such as might be used in changing lanes or in parallel parking. To exploit the full advantages of independent front and rear steering systems giving both tight turns and crabbing under the control of the driver requires two degrees of freedom: one for the front and one for the rear set of wheels. Two steering wheels could provide this, but would require two hands and would fail to allow the driver to respond with a quick "instinctive" response. Indeed, such a system could be dangerous, except at slow speeds.

The present invention is directed to a new and improved motor vehicle steering control which provides two degrees of freedom to steer both the front wheels and rear wheels of a vehicle, but which requires only one hand to use.

SUMMARY OF THE INVENTION

In accordance with a broad aspect of the present invention, there is provided a motor vehicle steering control which provides two degrees of freedom with a one-handed operation that is simple and intuitive. The control is achieved with a joystick control movable from side to side (e.g. as in an aircraft) in combination with a yoke control which rotates on an axis (e.g. like the steering wheel of a car). The yoke control (giving one degree of freedom) is mounted to the joystick control, the latter of which adds a second degree of freedom.

The steering of both the front and rear wheels of a variety of vehicles may be controlled, including vehicles where the operator rides with the vehicle and, as well, remote controlled vehicles where the operator is situated remote from the vehicle. The latter case contemplates remote controlled steering not only of full scale vehicles designed to move or haul some load but also model vehicles such as radio-controlled model cars and the like. Generally, the vehicle may be a vehicle having an internal combustion engine, an electric vehicle, or some hybrid vehicle.

In accordance with one embodiment of the present invention, there is provided a motor vehicle steering control comprising a joystick control, a yoke control, first and second differentials, and a drive signal inverter. The joystick control is pivotably mounted for controllable clockwise and anti-clockwise pivotal movement from a joystick neutral position and, in response to thereto, for producing a first output drive signal corresponding to the degree of such pivotal movement. The yoke control is pivotably mounted to the joystick control for controllable clockwise and anti-clockwise rotational movement from a yoke neutral position and, in response to such movement, for producing a second output drive signal corresponding to the degree of such rotational movement;

The first differential is operably coupled to the joystick control and to the yoke control for receiving the first and second output drive signals as input signals and, in response thereto, for combining the first and second input signals to produce a first steering drive signal corresponding to the sum of the first and second input signals.

The drive signal inverter is operably coupled to the joystick control for receiving the first output drive signal and, in response thereto, for producing an inverted drive signal corresponding to a degree of pivotal movement opposite to an actual degree of degree of pivotal movement of the joystick control from its neutral position.

The second differential is operably coupled to the drive inverter and to the yoke control for receiving the inverted drive signal and the second output drive signal and, in response thereto, for combining the inverted drive signal and the second output drive signal to produce a second steering drive signal corresponding to the sum of the inverted drive signal and the second output drive signal.

The signals referred to above may be mechanical or non-mechanical (e.g. electrical, optical or electro-optical). The particular character of the signals is not considered to be critical.

In accordance with another embodiment of the present invention, there is provided a motor vehicle comprising a vehicle frame extending longitudinally from a forward end to a rearward end, a pair of steerable front wheels mounted forwardly with respect to the frame, a pair of steerable rear wheels mounted rearwardly with respect to the frame, a joystick control as described above, a yoke control as described above, and linkages operably coupling the joystick control and the yoke control with at least one of the front wheels and at least one of the rear wheels such that:

(a) the front and rear wheels steer straight ahead when the joystick control and the yoke control are both in their respective neutral positions;

(b) the front wheels steer to the left and the rear wheels steer straight ahead when the joystick control is pivoted to the left from its neutral position while the yoke control is maintained in its neutral position;

(c) the front wheels steer to the right and the rear wheels steer straight ahead when the joystick control is pivoted to the right from its neutral position while the yoke control is maintained in its neutral position;

(d) the front wheels steer to the left and the rear wheels steer to the right when the joystick control is maintained in its neutral position and the yoke control is pivoted anti-clockwise from its neutral position;

(e) the front wheels steer to the right and the rear wheels steer to the left when the joystick control is maintained in its neutral position and the yoke control is pivoted clockwise from its neutral position;

(f) the front and rear wheels steer to the left when the joystick control is pivoted to the left from its neutral position and the yoke control is pivoted clockwise from its neutral position;

(g) the front and rear wheels steer to the right when the joystick control is pivoted to the right from its neutral position and the yoke control is pivoted anti-clockwise from its neutral position;

(h) the front wheels steer straight ahead and the rear wheels steer to the right when the joystick control is pivoted to the right from its neutral position and the yoke control is pivoted clockwise from its neutral position; and, (i) the front wheels steer straight ahead and the rear wheels steer to the left when the joystick control is pivoted to the left from its neutral position and the yoke control is pivoted anti-clockwise from its neutral position.

In accordance with the foregoing other embodiment, the linkages can comprise a first differential as described above, a drive signal inverter as described above, and a second differential as described above.

The foregoing and other features of the present invention will now be described with reference to the drawings wherein:

DETAILED DESCRIPTION

Figure 1:
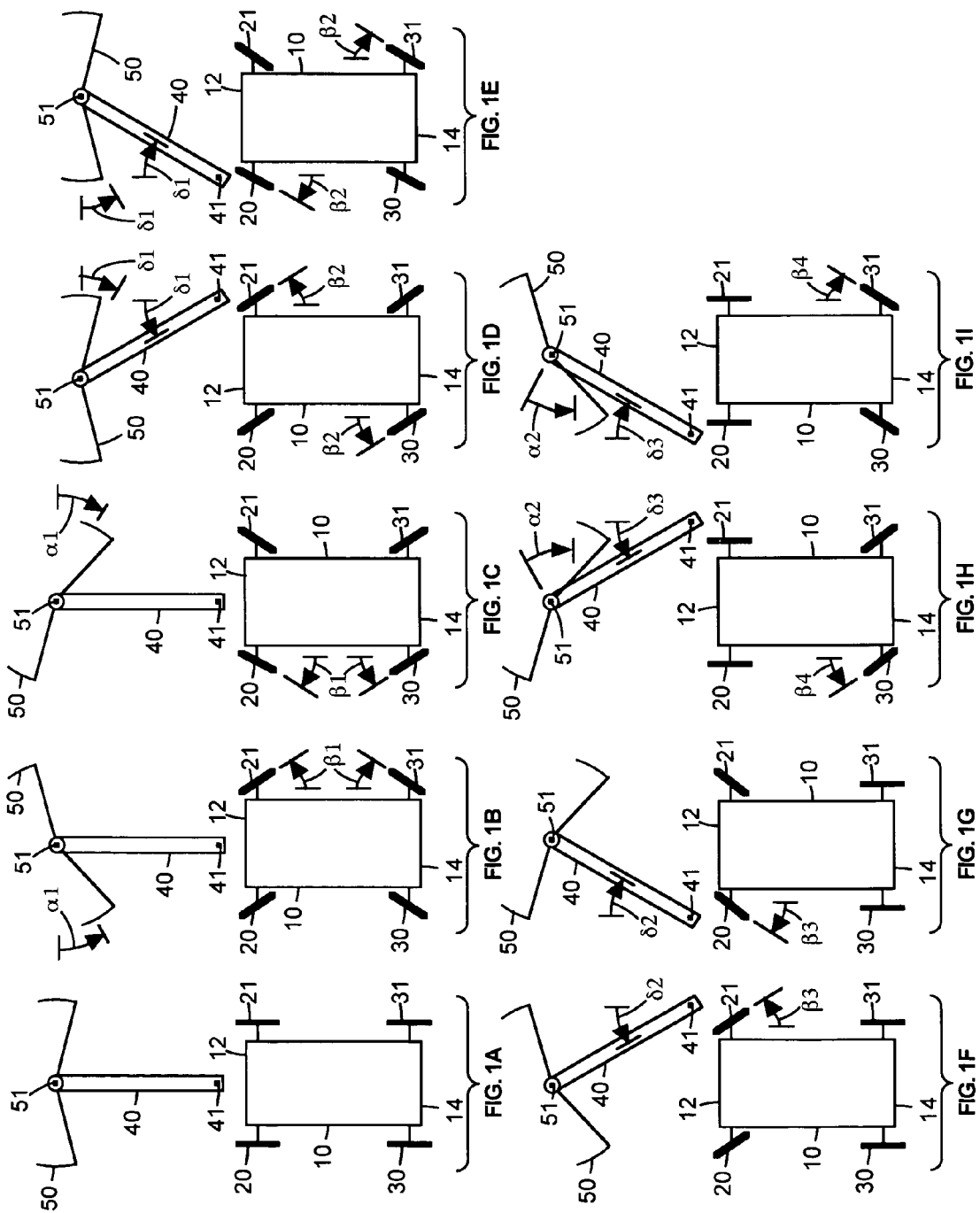
FIG. 1 consists of several views (A to I) illustrating in a representative manner a joystick control and a yoke control in various positions relative to each other, and resulting wheel positions of a motor vehicle.

Referring to FIG. 1, each view A to I representationally depicts a motor vehicle comprising a vehicle frame 10 which extends longitudinally from a forward end 12 to a rearward end 14, a pair of steerable front wheels 20, 21 mounted forwardly with respect to frame 10, and a pair of steerable rear wheels 30, 31 mounted rearwardly with respect to frame 10. The vehicle further comprises a joystick control 40 and a yoke control 50.

Joystick control 40 is pivotably mounted in relation to frame 10 for controllable clockwise and anti-clockwise pivotal movement about an axis 41 from a joystick neutral position shown in FIG. 1A. Yoke control 50 is pivotably mounted proximate the top or distal end of joystick control 40 for controllable clockwise and anti-clockwise rotational movement about an axis 51 from a yoke neutral position, also shown in FIG. 1A. Herein, the frame of reference for the position of joystick control 40 is expressed relative to the vehicle. The frame of reference for the position of yoke control 50 is expressed relative to joystick control 40.

The steering positions of front wheels 20, 21 and rear wheels 30, 31 depend upon the degree of pivotal movement of joystick control 40 about axis 41 and the degree of rotational movement of yoke control 50 about axis 51. In FIG. 1, the following positions are illustrated:

FIG. 1A As indicated above, joystick control 40 and yoke control 50 are in their respective neutral positions. Front wheels 20, 21 and rear wheels 30, 31 steer straight ahead.

FIG. 1B Relative to joystick control 50, yoke control 40 has been rotated anti-clockwise through an angle α1 from the neutral position shown in FIG. 1A. Joystick control 50 has been maintained its neutral position. In response, front wheels 20, 21 have turned to the left through an angle β1 and rear wheels 30, 31 turned to the right through an angle β1. This movement is comparable to turning a steering wheel to the left—producing a turn to the left but in which both the front and rear wheels contribute. The rear wheels follow the tracks made by the front wheels (e.g. useful in snow).

Note: When it is stated herein that the front wheels or rear wheels have turned through an angle β (i.e. β1, β2, β3, β4), it is to be understood that in practice one wheel in the pair of wheels (namely, the inner wheel on a turn) preferably will have turned not only through the angle β but also through a slight added angle to avoid scuffing: see discussion below with respect to turning circles.

FIG. 1C Here, the position of yoke control 50 relative to joystick control 40 is opposite to that shown in FIG. 1B, thereby producing a turn to the right.

FIG. 1D Joystick control 40 has been rotated anti-clockwise through an angle δ1 from the neutral position shown in FIG. 1A. Relative to joystick control 40, yoke control 50 has been rotated anti-clockwise through an angle δ1. In response, front wheels 20, 21 and rear wheels 30,31 have all turned to the left through an angle β2. The result produces a crab-like movement to the left (e.g. a "lane change" but no change of heading.

Intuitively, a vehicle driver may well have the perception that the rotational position of yoke control 50 as shown in FIG. 1D remains unchanged from that shown in FIG. 1A. If the driver's frame of reference is the vehicle, then the perception is a correct. This is considered to be a desirable perception because it contributes to the intuitiveness of vehicle control. However, if as noted above the frame of reference for rotational movement of yoke control 50 is taken as being joystick control 40, then as seen in FIG. 1D there is relative rotational movement (angle δ1) between yoke control 50 and joystick control 40

FIG. 1E The position shown in FIG. 1E is opposite to that shown in FIG. 1D, thereby producing a crab-like movement to the right.

FIG. 1F Here, joystick control 40 has been rotated anti-clockwise through an angle δ2 from the position shown in FIG. 1A, but the angle between it and yoke control 50 has been kept fixed. Yoke control 50 has not been rotated and remains in its neutral position relative to joystick control 40. The result is that front wheels 20, 21 steer to the left while rear wheels 30, 31 steer straight ahead.

This is rather like leaning a motorcycle into a turn. It produces a left turn like that with conventional steering: the rear wheels remain neutral and do not contribute.

FIG. 1G The position shown in FIG. 1G is opposite to that shown in FIG. 1F, thereby producing a right turn like that with conventional steering.

FIG. 1H Here, joystick control 40 has been rotated anti-clockwise through an angle δ3 from the position shown in FIG. 1A. As well, yoke control 50 has been turned clockwise through an angle α2 with respect to yoke control 50. The result is that front wheels 20, 21 steer straight ahead while rear wheels 30, 31 steer to the left—effectively swinging the rear of the vehicle to the left and causing a heading change to the right.

This control is perhaps the least intuitive for a driver, but it quickly can become clear to the driver that alternating and opposite movement will produce a fishtailing effect.

This can be helpful in parallel parking to bring rear wheels 30, 31 closer to a curb and also in backing when a trailer is attached.

FIG. 1I The position shown in FIG. 1I is the opposite to that shown in FIG. 1F.

The joystick control and yoke control movements shown in FIGS. 1A to 1I normally would be shaded one into another as the driver became familiar with them. For normal driving, it is contemplated that control positions like those shown in FIGS. 1F and 1G would be used (viz. where rear wheels 30, 31 steer straight ahead). However, long vehicles often might use control positions like those shown in FIGS. 1B and 1C (viz. where rear wheels 30, 31 are turned in a direction opposite to that of front wheels 20, 21). Cornering at high speed or over icy roads may use a combination of control positions like those shown in FIGS. 1B and 1F (or FIGS. 1C and 1G) to maximize the reactive force vector from the tires to change the direction of travel. When backing a trailer which is under tow, control positions like those shown in FIGS. 1D and 1E can simplify the task (viz. where the resulting steering positions of the front and rear wheels enable the towing vehicle to crab to the right or crab to the left when backing up).

It will be clearly evident that a user can manipulate both joystick control 40 and yoke control 50 with only one hand. While both arms of the joystick control might be grasped, the user need only grasp one arm to rotate yoke control and/or to pivot the joystick control.

In more detail, joystick control 40 and yoke control 50 provide proportional left (L), center (O), and right turn (R) output drive signals which are combined in accordance with the following matrices to provide steering drive signals or commands to front wheels 20, 21 and rear wheels 30, 31:

|  | Joystick Control | | |
|---|---|---|---|
|  | L | O | R |
| Yoke Control L | 2L | L | O |
| Yoke Control O | L | O | R |
| Yoke Control R | O | R | 2R |

Matrix 1-Front Wheels 20, 21

|  | Joystick Control | | |
|---|---|---|---|
|  | R | O | L |
| Yoke Control L | O | L | 2L |
| Yoke Control O | R | O | L |
| Yoke Control R | 2R | R | O |

Matrix 2-Rear Wheels 30, 31

The foregoing matrices show that the turning commands may add (if similar) or cancel (if opposite). Only discrete conditions producing steering drive signals 2L (maximum left turn), L, O (straight ahead driving), R, 2R (maximum right turn) are illustrated. Of course, there is a continuum of possible conditions and resulting drive signals between the extremes. In the case of front wheels 20, 21, it may be noted that straight ahead driving will occur not only if the output drive signals from joystick control 40 and yoke control 50 are both O, but also if they are fully opposed to each other. Thus, L+R in Matrix 1 is summing to O. Similarly, in the case of rear wheels 30, 31, straight ahead driving will occur not only if the output drive signals from joystick control 40 and yoke control 50 are both O, but also if they are fully opposed to each other. Thus, L+R in Matrix 2 is also summing to O.

Figure 2:
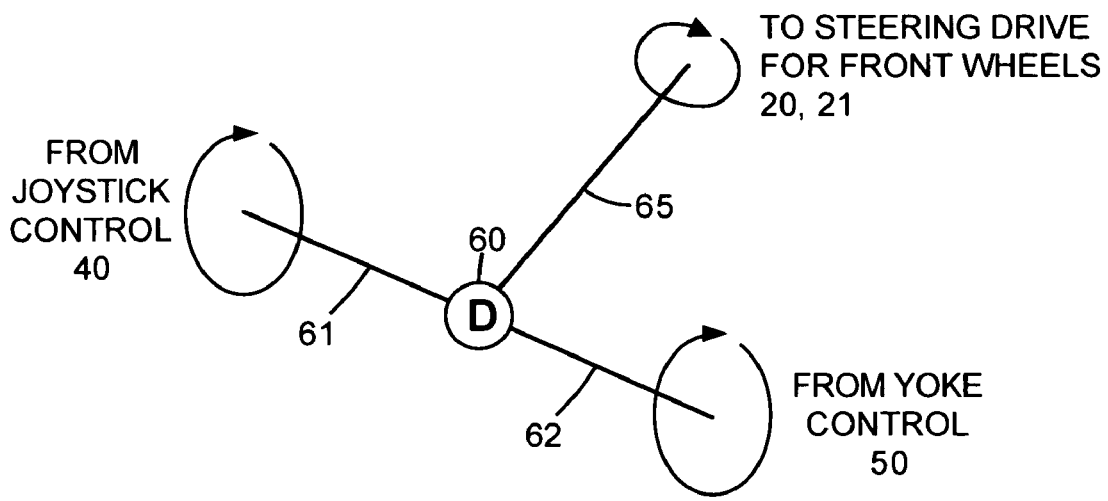
FIG. 2 is a diagrammatic representation showing the control of the front wheels of a vehicle in response to rotational movements of the joystick control and yoke control shown in FIG. 1.

As graphically depicted in FIG. 2, Matrix 1 may be mechanically implemented by a first differential 60 coupled to joystick control 40 by an input shaft 61 and to yoke control 50 by an input shaft 62. Shaft 61 rotationally transmits the output drive signal from joystick control 40 as an input to differential 60. Likewise shaft 62 rotationally transmits the output drive signal from yoke control 50 as an input to differential 60.

The foregoing inputs to differential 60 are combined to produce a front wheel steering drive signal corresponding to the sum of the input signals. The resulting drive signal is rotationally transmitted from differential 60 by an output shaft 65 to provide a steering input to front wheels 20, 21.

Figure 3:
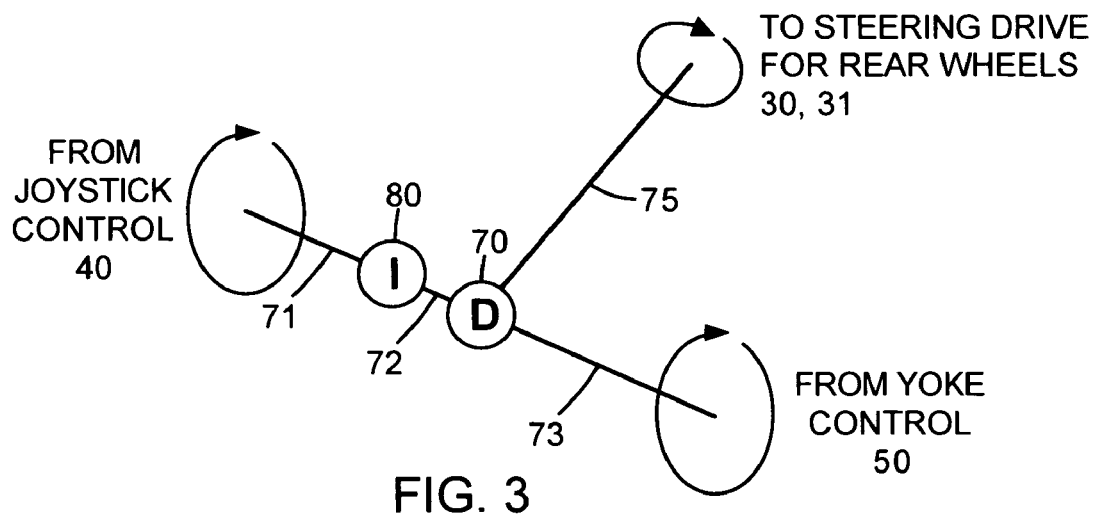
FIG. 3 is a diagrammatic representation showing the control of the rear wheels of a vehicle in response to rotational movements of the joystick control and yoke control shown in FIG. 1.

As graphically depicted in FIG. 3, Matrix 2 may be mechanically implemented by a second differential 70 coupled to joystick control 40 by shafts 71, 72 and an inverter 80, and to yoke control 50 by an input shaft 73. Shaft 71 rotationally transmits the output drive signal from joystick control 40 as an input to inverter 80 which in response produces an inverted drive signal on shaft 72 opposite to that provided by shaft 71 (i.e. if shaft 71 rotates a given number of degrees clockwise, then shaft 72 rotates an equal number of degrees anti-clockwise). Shaft 72 rotationally transmits the inverted drive signal as an input to differential 70. Shaft 73 rotationally transmits the output drive signal from yoke control 50 directly as an input to differential 70.

The foregoing inputs to differential 70 are combined to produce a rear wheel steering drive signal corresponding to the sum of the input signals. The resulting drive signal is rotationally transmitted from differential 70 by an output shaft 75 to provide a steering input to front wheels 30, 31.

Since the design of joysticks, yokes, mechanical differentials and mechanical inverters is well known, they will not be described here in further detail. However, and as will be fully understood by those skilled in the art, the signal output from a joystick control need not be a mechanical signal. Similarly, the signal output from a yoke control need not be a mechanical signal. Such outputs may be non-mechanical signals such as electrical or electronic signals. Likewise, the mechanical derivation of the matrix outputs, could be replaced by equivalent analog or digital electronic circuitry. Such circuitry which, when circuit outputs are coupled to suitable servo-mechanisms for translating electrical signals to mechanical equivalents, can control steering in effectively the same manner as the completely mechanical system described above.

Figure 4:
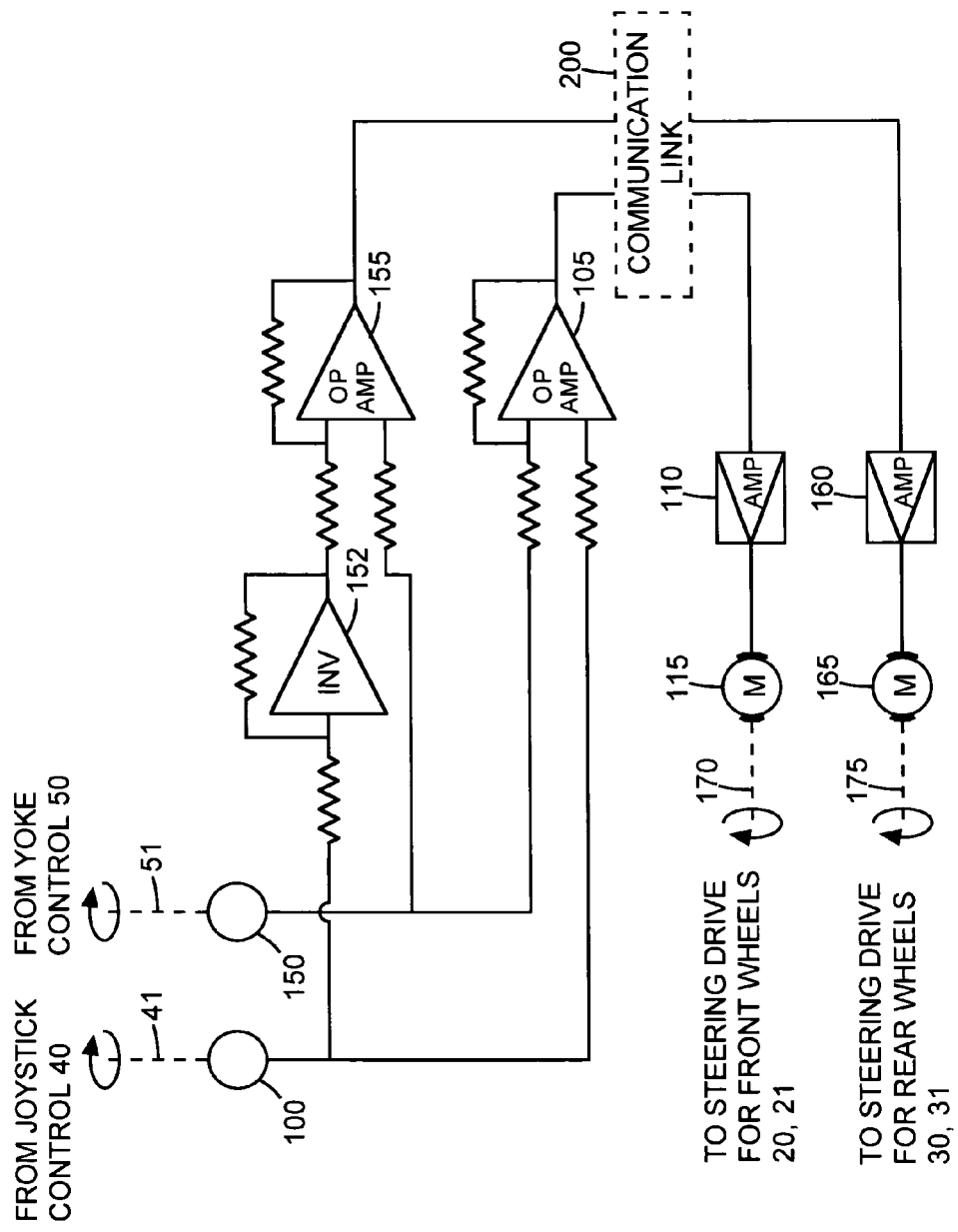
FIG. 4 is a partially schematic, partially diagrammatic, illustration of a steering control in accordance with the present invention. The control utilizes operational amplifiers to generate appropriate steering drive signals.

By way of example, FIG. 4 illustrates a steering control which includes a pair of angular position detectors 100, 150, a pair of amplifiers 105, 155 wired by resistors as operational amplifiers, and an amplifier wired by resistors as an inverter 152. Angular position detector 100 fitted on the fulcrum or axis 41 of joystick control 40 may be considered as part of joystick control 40 and produces an analog signal voltage corresponding to the degree which control 40 has been pivoted clockwise or anti-clockwise from its neutral position. Similarly, angular position detector 150 fitted on the fulcrum or axis 51 of yoke control 50 may be considered as part of yoke control 50 and produces an analog signal voltage corresponding to the degree which control 50 has been rotated clockwise or anti-clockwise from its neutral position.

For the steering of front wheels 20, 21, the output signals from position detectors 100, 150 are fed directly to operational amplifier 105 where they are summed. For the steering of rear wheels 30, 31, the output signal from position detector 150 is fed directly to operational amplifier 155. But, the output signal from detector 100 is first passed through inverter 152 before it is fed to operational amplifier 155. Operational amplifier 155 then sums the inverted signal from inverter 152 and the direct signal from position detector 150. In effect, it will be understood that operational amplifier 105 in FIG. 4 is performing a function like that of differential 60 in FIG. 2. Likewise, it will be understood that inverter 152 and operational amplifier 155 in FIG. 4 are performing a function like that of differential 70 and inverter 80 in FIG. 3.

The embodiment shown in FIG. 4 further includes an optional communication link 200, a pair of servo amplifiers 110, 160, and a pair of servo motors 115, 165. In the absence of communication link 200 the output of operational amplifier 105 is connected directly to the input of servo amplifier 110. Likewise, the output of operational amplifier 155 is connected directly to the input of servo amplifier 160.

When present, communication link 200 may perform signal processing functions as discussed below. However, the input to servo amplifier 110 will still depend from or correspond to the output from operational amplifier 105 as if the communication link was not present. Likewise, the input to servo amplifier 160 will still depend from or correspond to the output from operational amplifier 155 as if the communication link was not present.

Servo amplifier 110 produces an analog voltage corresponding to the front wheel commands from joystick control 40 and yoke control 50. Motor 115 in turn rotates to produce a corresponding mechanical steering drive signal on a shaft 170. Similarly, amplifier 160 produces an analog voltage corresponding to the rear wheel commands from joystick control 40 and yoke control 50, and motor 165 in turn rotates to produce a corresponding mechanical steering drive signal on a shaft 175. Generally, it will be appreciated that shafts 170, 175 shown in FIG. 4 are the equivalent of shafts 65, 75 shown in FIGS. 2 and 3.

More generally, it should be understood that the steering drive signals produced by the present invention (whether mechanical or electrical) are primitive signals and not necessarily signals which by themselves will determine the precise steering positions of vehicle wheels. For example, in the case of rack and pinion steering, one road wheel of a vehicle may be turned slightly more than another by reason of Ackerman compensation (discussed below). However, any such compensation is herein considered to be an optional derivative of the steering commands provided by the present invention. The steering commands provided by the present invention can be processed in various ways to control the movement of front and rear wheels collectively or individually.

With regard to optional communication link 200 shown in FIG. 4, it will be appreciated that there are numerous forms that it may take. By way of example, communication link 200 may include analog to digital converters for receiving the outputs of operational amplifiers 105, 155, a transmitter for receiving, processing and transmitting the digitized signals, a receiver for receiving the transmitted signals, and digital to analog converters for producing analog signal outputs corresponding to the inputs received by the analog to digital converters. The analog signal outputs from communication link 200 are then provided as inputs to servo amplifiers 110, 160.

The transmitter may be a radio frequency transmitter (and the receiver necessarily a radio frequency receiver). However, other forms of transmission may be used such as infra red or equivalent wireless transmissions.

Since the design of transmitters and receivers, analog to digital and digital to analog converters is well known, they are not described here in further detail.

It is contemplated that a system utilizing electronics would be easier to manufacture than a completely mechanical system. But, it would require "drive-by-wire" steering. If such a system had suitable reliability—as do drive-by-wire systems in aircraft and large ships, it would be preferable. Drive-by-wire systems have been used in experimental cars.

Figure 5:
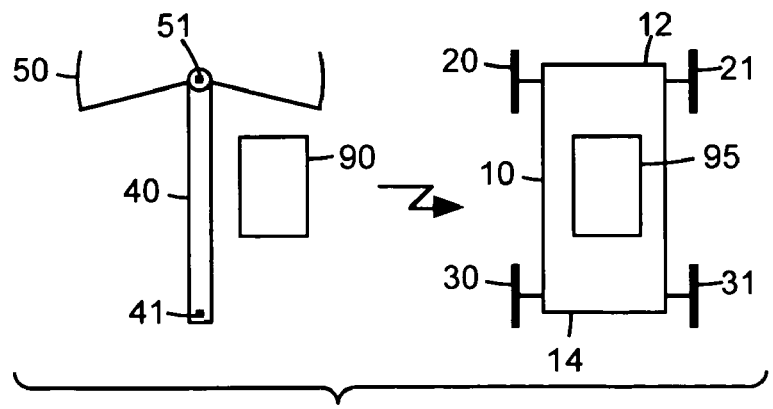
FIG. 5 is a diagrammatic representation showing a remote steering control in accordance with the present invention, the remote control including a transmitter for transmitting control signals corresponding to rotational movements of a joystick control and a yoke control, and a receiver for receiving such signals at a remote vehicle location.

The foregoing recognizes that the steering of a vehicle may be remotely controlled. By way of example, FIG. 5 illustrates a vehicle steering control where vehicle 10 is remotely coupled to joystick and yoke controls 40, 50 by means of a transmitter 90 and receiver 95. Obviously, remote control steering may be implemented for full scale vehicles as well as model vehicles such as model cars and the like.

Note Regarding Turning Circles and the Scuffing of Tires:

It is well known that in a vehicle with conventional front wheel steering, the center of its turning circle should lie on a line extended outward from the rear axle, and the rear wheels should be at right angles to this line so that they will be tangential to their turning circles, which will be concentric. This means that that the front wheels will not remain parallel to one another during turns. Each front wheel will follow a different turning circle, the inner wheel following a circle with a smaller radius than the outer wheel. The vehicle geometry ensuring this is credited to Rudolf Ackerman (Ackerman Principle) and can be achieved using angled steering arms. If the front wheels were turned by the same amount and remained parallel, then the inside wheel would scuff (effectively sliding sideways), lessening the effectiveness of the steering and creating unwanted wear on tires.

If now the rear wheels turn to produce a heading change, then the center of the turning circle will no longer lie on that line. Indeed, it may lie anywhere in the ground plane. Ackerman's solution fails: the wheels may no longer be tangential to their respective turning circles.

For simplicity, assume that steering commands are sent only to the wheels on the left side of the vehicle and that wheels on the right side are free to caster. There will now be only one turning circle and the axes of each wheel will pass through it. The location of the center of this circle can be computed instantaneously and the lengths of tie rods directing the right-sided wheels can be determined to match the caster positions so that these wheels are under direct steering control like those on the left. In principle, the lengths of the tie rods can be adjusted to suit the calculations by power-driven turnbuckles under automatic (i.e. computer) control. The implementation of this "variable Ackerman" system can be readily achieved with conventional computer and servo technology.

As will be readily understood by those skilled in the art, various refinements to the present invention are possible without departing from the spirit and scope of the invention as described above. Refinements may include non-linearity of response and Ackerman compensation to reduce tire scuffing, but which nevertheless fall within the scope of the claims which follow.

I claim:

1. A motor vehicle steering control comprising:
   (a) a joystick control pivotably mounted for controllable clockwise and anti-clockwise pivotal movement from a joystick neutral position and, in response thereto, for producing a first output drive signal corresponding to the degree of such pivotal movement;
   (b) a yoke control pivotably mounted to said joystick control for controllable clockwise and anti-clockwise rotational movement from a yoke neutral position and, in response thereto, for producing a second output drive signal corresponding to the degree of such rotational movement;

(c) a first differential operably coupled to said joystick control and to said yoke control for receiving said first and second output drive signals as input signals and, in response thereto, for combining said first and second input signals to produce a first steering drive signal corresponding to the sum of said first and second input signals;

(d) a drive signal inverter operably coupled to said joystick control for receiving said first output drive signal and, in response thereto, for producing an inverted drive signal corresponding to a degree of pivotal movement opposite to an actual degree of degree of pivotal movement of said joystick control from its neutral position; and, (e) a second differential operably coupled to said drive signal inverter and to said yoke control for receiving said inverted drive signal and said second output drive signal and, in response thereto, for combining said inverted drive signal and said second output drive signal to produce a second steering drive signal corresponding to the sum of said inverted drive signal and said second output drive signal.

2. A vehicle steering control as defined in claim 1, wherein said signals are mechanical signals.

3. A vehicle steering control as defined in claim 1 operatively mounted to a vehicle having front and rear wheels for controlling the steering of said wheels.

4. A vehicle steering control as defined in claim 1, wherein said signals are non-mechanical signals.

5. A vehicle steering control as defined in claim 4, further comprising a transmitter operatively coupled to said first and second differentials for receiving said first and second steering drive signals as inputs and for wirelessly transmitting corresponding first and second steering drive signals as outputs.

6. A vehicle steering control as defined in claim 5 for a radio-controlled model vehicle, said transmitter being a radio frequency transmitter, said model vehicle comprising a radio frequency receiver for receiving said first and second steering drive signals transmitted by said transmitter.

* * * * *